US012625449B2

(12) United States Patent
Shirai et al.

(10) Patent No.: US 12,625,449 B2
(45) Date of Patent: May 12, 2026

(54) IMAGE INSPECTION DEVICE AND IMAGE FORMING APPARATUS USING THE SAME

(71) Applicant: FUJIFILM Business Innovation Corp., Tokyo (JP)

(72) Inventors: Masakazu Shirai, Kanagawa (JP); Yu Saito, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 18/315,529

(22) Filed: May 11, 2023

(65) Prior Publication Data

US 2024/0168422 A1 May 23, 2024

(30) Foreign Application Priority Data

Nov. 22, 2022 (JP) ................................ 2022-186878

(51) Int. Cl.
*G03G 15/00* (2006.01)
*G03G 21/20* (2006.01)

(52) U.S. Cl.
CPC ....... *G03G 15/5041* (2013.01); *G03G 21/206* (2013.01)

(58) Field of Classification Search
CPC ......................... G03G 15/5041; G03G 21/206
See application file for complete search history.

(56) References Cited

U.S. PATENT DOCUMENTS

| | | | | |
|---|---|---|---|---|
| 2004/0009005 A1* | 1/2004 | Suga | G03G 15/60 399/94 | |
| 2018/0278762 A1* | 9/2018 | Kawatsu | H04N 1/00557 | |
| 2020/0026236 A1* | 1/2020 | Shigihara | G03G 15/5054 | |
| 2021/0306504 A1* | 9/2021 | Takayama | H04N 1/00591 | |

FOREIGN PATENT DOCUMENTS

| | | | | |
|---|---|---|---|---|
| JP | 2001-217974 | A | | 8/2001 |
| JP | 2002-14597 | A | | 1/2002 |
| JP | 2013205546 | A | * | 10/2013 |
| JP | 2015107872 | A | * | 6/2015 |
| JP | 2016-9933 | A | | 1/2016 |
| JP | 2017146405 | A | * | 8/2017 |
| JP | 2020046517 | A | * | 3/2020 |
| JP | 2021173829 | A | * | 11/2021 |

* cited by examiner

*Primary Examiner* — Sevan A Aydin
(74) *Attorney, Agent, or Firm* — OLIFF PLC.

(57) ABSTRACT

An image inspection device includes: an illumination part extending in a width direction of a medium, which intersects a medium transport direction, so as to face a medium transport path, and configured to radiate light on an image formed on a surface of the medium; a reading part configured to read reflected light from the image as image inspection information; and a cooling part configured to cool an entire area of the illumination part in the width direction of the medium. The cooling part includes one blowing part provided on one side in the width direction of the medium and configured to suck and blow outside air, a first guide extending in the width direction of the medium and configured to guide the air blown from the blowing part to a flow path extending in the width direction of the medium, and a second guide configured to guide the air, guided by the first guide, in the medium transport direction to a space where the illumination part is disposed, and distribute the air such that an air volume is uniform over the entire area of the illumination part in the width direction of the medium.

17 Claims, 10 Drawing Sheets

IMAGE INSPECTION DEVICE AND IMAGE FORMING APPARATUS USING THE SAME

CROSS-REFERENCE TO RELATED APPLICATIONS

This application is based on and claims priority under 35 USC 119 from Japanese Patent Application No. 2022-186878 filed Nov. 22, 2022.

BACKGROUND

(i) Technical Field

The present disclosure relates to an image inspection device and an image forming apparatus using the same.

(ii) Related Art

Japanese Unexamined Patent Application Publication Nos. 2001-217974 (Detailed Description, FIG. 1) and 2002-014597 (Detailed Description, FIG. 8) disclose image forming apparatuses in which a heat generating object is cooled by the outside air.

Japanese Unexamined Patent Application Publication No. 2001-217974 (Detailed Description, FIG. 1) discloses an image reading apparatus having: a first opening through which heated air in an apparatus frame accommodating an optical component is discharged; a second opening through which waste heated air in a substrate frame accommodating a signal processing substrate and isolated from the apparatus frame is discharged; and a single exhaust fan that sucks the heated air from through the first and second openings substantially simultaneously.

Japanese Unexamined Patent Application Publication No. 2002-014597 (Detailed Description, FIG. 8) discloses an image forming apparatus including at least one of a fan that discharges the air inside an apparatus body to the outside and a fan that introduces the outside air into the apparatus body. A cleaner cooling duct leading to the fan has multiple openings, and the cross-sectional area of the duct is reduced from an inlet toward the far side, so that the air velocity is substantially uniform over the entire area from the inlet to the far side of the duct.

Japanese Unexamined Patent Application Publication No. 2016-009933 (Detailed Description, FIG. 1) discloses an image forming apparatus incorporating an image inspection device that reads an image formed on a surface of a medium after the image formation to inspect for an image defect.

SUMMARY

Aspects of non-limiting embodiments of the present disclosure relate to providing an image inspection device in which the entire area of an illumination part is substantially uniformly cooled with a single blowing part and in which attachment of foreign matter, such as paper dust, to the illumination part and a reading part is suppressed, and an image forming apparatus using the same.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image inspection device including: an illumination part extending in a width direction of a medium, which intersects a medium transport direction, so as to face a medium transport path, and configured to radiate light on an image formed on a surface of the medium; a reading part configured to read reflected light from the image as image inspection information; and a cooling part configured to cool an entire area of the illumination part in the width direction of the medium, wherein the cooling part includes: one blowing part provided on one side in the width direction of the medium and configured to suck and blow outside air; a first guide extending in the width direction of the medium and configured to guide the air blown from the blowing part to a flow path extending in the width direction of the medium; and a second guide configured to guide the air, guided by the first guide, in the medium transport direction to a space where the illumination part is disposed, and distribute the air such that an air volume is uniform over the entire area of the illumination part in the width direction of the medium.

BRIEF DESCRIPTION OF THE DRAWINGS

Exemplary embodiments of the present disclosure will be described in detail based on the following figures, wherein.

DETAILED DESCRIPTION

Outline of Exemplary Embodiments

Figure 1A:
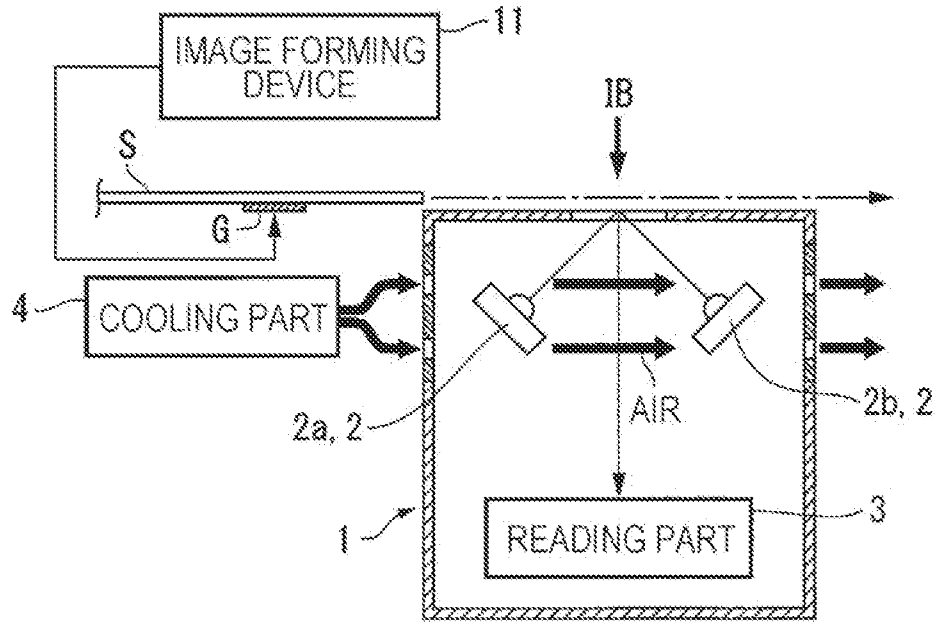
FIG. 1A shows an outline of an image forming apparatus according to an exemplary embodiment that incorporates an image inspection device of the present disclosure.
Figure 1B:
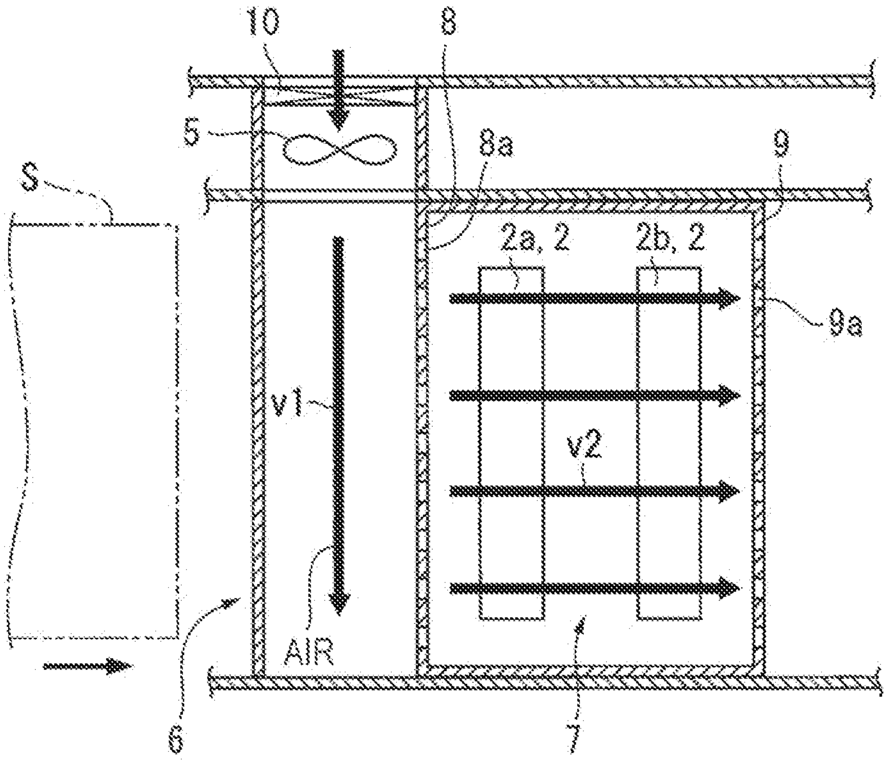
FIG. 1B is a view viewed from a direction IB in FIG. 1A.

FIGS. 1A and 1B show an outline of an image forming apparatus according to an exemplary embodiment, including an image inspection device of the present disclosure.

As shown in FIG. 1A, the image forming apparatus includes an image inspection device 1 that reads an image formed on a surface of a medium S to inspect for an image defect, and an image forming device 11 that is provided upstream of the image inspection device 1 in the medium transport direction and that forms an image on the surface of the medium S.

In this example, the image inspection device 1 includes: an illumination part 2 that extends in the width direction of the medium S, which intersects the medium transport direction, so as to face a medium transport path and that radiates light on an image G on the surface of the medium S; a reading part 3 that reads reflection light from the image G as image inspection information; and a cooling part 4 that cools the entire area of the illumination part 2 in the width direction of the medium S. The cooling part 4 includes: one blowing part 5 that is provided on one side in the width direction of the medium S and sucks and blows the outside air; a first guide 6 that extends in the width direction of the medium S and guides the air blown from the blowing part 5 to a flow path extending in the width direction of the medium S; and a second guide 7 that guides the air, guided by the first guide 6, in the medium transport direction toward the space where the illumination part 2 is disposed and that distributes the air such that the air volume is uniform over the entire area of the illumination part 2 in the width direction of the medium S.

In this technical configuration, the image inspection device 1 only needs to inspect an image G on a surface of a medium S. The image inspection device 1 may be used either alone or as one element of the image forming apparatus, together with the image forming device 11, as shown in FIG. 1A. When an image is formed on one surface of a medium S, one image inspection device 1 is needed, and, when an image is formed on each surface of a medium S, for example, the medium S may be reversed so that the image G on each surface of the medium S is inspected one by one, or two image inspection devices 1 may be provided so as to face both surfaces of the medium S to separately inspect the images G on both surfaces of the medium S.

The medium S may be transported either substantially horizontally or substantially vertically.

It is preferable that the illumination part 2 include an illumination element that extends in the width direction of the medium S, which intersects the medium transport direction, and that uniformly radiates light on an image G on a surface of a medium S. The illumination element may be a fluorescent lamp, a xenon lamp, an LED array, or the like. The number of illumination elements is not limited to one, and it is also possible that a pair of illumination elements are arranged symmetrically with respect to an illumination spot to make the illuminance of the illumination spot more uniform.

The reading part 3 includes a reading element that reads reflection light from the image G, and optical systems, such as an imaging element and a reflection element, for guiding the reflection light to the reading element.

In order to ensure the reading performance of the reading part 3, the entire area of the illumination part 2 in the width direction of the medium S needs to be uniformly cooled so that the intensity of the light radiated from the illumination part 2 is maintained uniform. Hence, in this example, the cooling part 4 for cooling the entire area of the illumination part 2 in the width direction of the medium S is provided.

In this example, the cooling part 4 includes one blowing part 5, the first guide 6, and the second guide 7.

The blowing part 5 is provided on one side in the width direction of the medium S and may be a fan, a blower, or the like that sucks and blows the outside air. As mentioned above, the blowing part 5 is provided on one side in the width direction of the medium S, which corresponds to the front side or the rear side of the image inspection device 1 as viewed from the front side of the image inspection device 1, when the medium is transported horizontally or vertically. It is desirable that the blowing part 5 suck the outside air through a filter 10 so that clean cooling air is used.

The first guide 6 guides the air blown from the blowing part 5 not to the space where the lighting part 2 is installed, but in the width direction of the medium S.

The second guide 7 guides the air, guided by the first guide 6, in the medium transport direction to cool the entire area of the illumination part 2 in the width direction of the medium S. Herein, the medium transport direction includes both upstream and downstream directions.

If the air is guided in the width direction of the medium S, foreign matter, such as paper dust, is likely to accumulate on one side in the longitudinal direction of the illumination part 2, which corresponds to the width direction of the medium S.

To avoid this, the second guide 7 guides the air in the medium transport direction. Hence, even if foreign matter is present around the illumination part 2, the foreign matter floating around the inspection area is effectively removed from the inspection area. Hence, there is a low risk of scattering of foreign matter on the illumination part 2 and the reading part 3.

The second guide 7 needs to distribute the air volume uniformly over the entire area of the illumination part 2 in the width direction of the medium S.

In this case, the second guide 7 may distribute the air volume uniformly depending on the air velocity distribution in the first guide 6.

For example, when the first guide 6 has a structure in which the air velocity v1 is higher on the side farther from the blowing part 5 than on the side closer to the blowing part 5, the air velocity v2 and the air volume can be made uniform by making the second guide 7 have a structure in which the ventilation area is gradually reduced from the side closer to the blowing part 5 toward the side farther from the blowing part 5 in the flow path direction of the first guide 6.

In one specific configuration example, as shown in FIG. 1B, an inlet-side partition member 8 and an outlet-side partition member 9 for partitioning the space accommodating the illumination part 2 have multiple vent holes *8a* and *9a*, respectively. The ventilation area of the vent holes *8a* in the inlet-side partition member 8 is uniform in the flow path direction of the first guide 6, and the ventilation area of the vent holes *9a* in the outlet-side partition member 9 is gradually reduced from the side closer to the blowing part 5 toward the side farther from the blowing part 5 in the flow path direction of the first guide 6.

When the first guide 6 has a cross-sectional structure that makes the velocity v1 of the air blown from the blowing part 5 uniform, the air velocity v2 and the air volume can be made uniform by making the second guide 7 have a uniform ventilation area in the flow path direction of the first guide 6.

The present disclosure will be described in more detail based on exemplary embodiments shown in the accompanying drawings.

First Exemplary Embodiment

Figure 2:
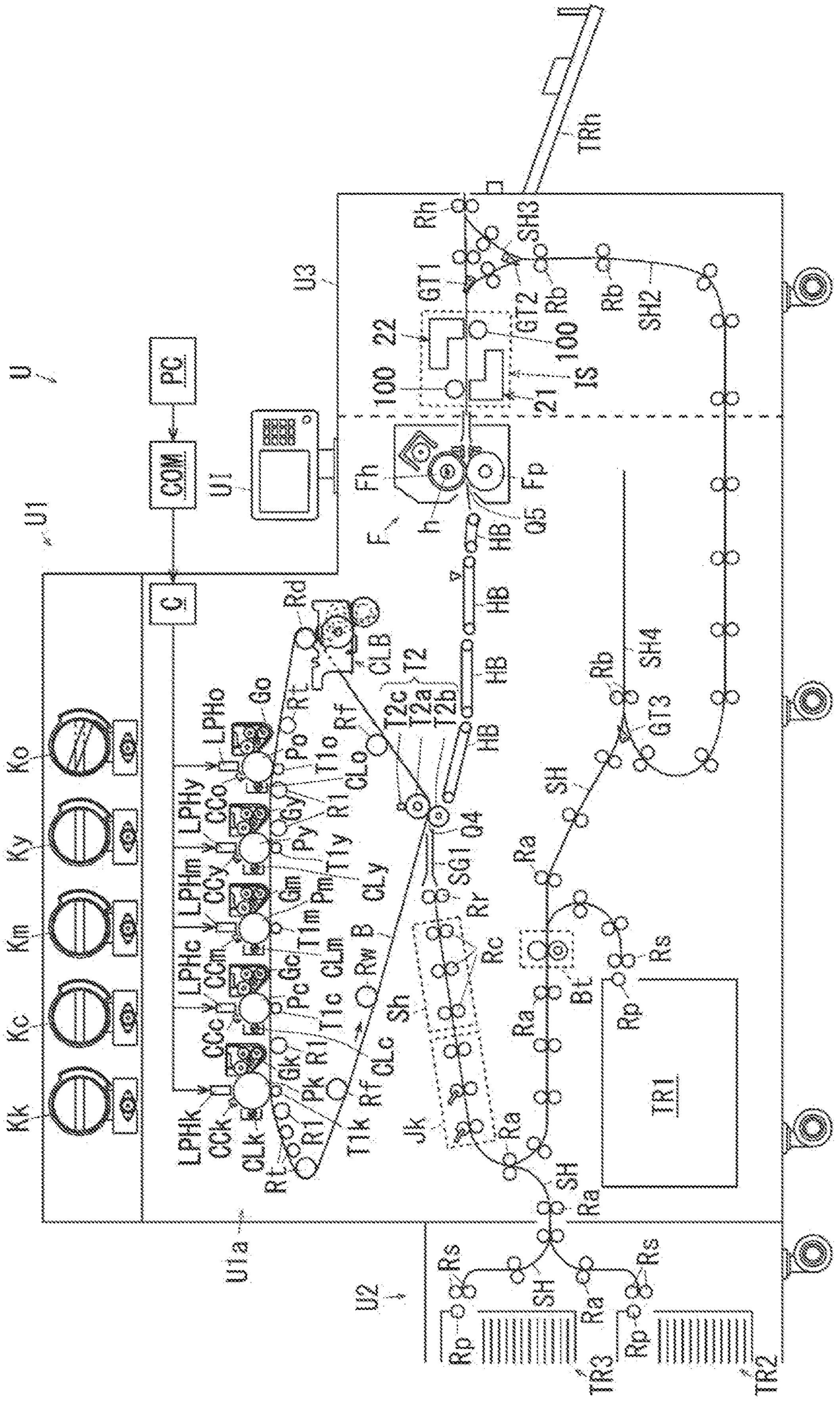
FIG. 2 shows an overall configuration of the image forming apparatus according to the first exemplary embodiment.

FIG. 2 shows the overall configuration of an image forming apparatus according to the first exemplary embodiment.

Overall Configuration of Image Forming Apparatus

In FIG. 2, a printer U, serving as an example of the image forming apparatus, includes: a printer body U1, serving as an example of an image forming device; a feeder unit U2, serving as an example of a feeding device that feeds media to the printer body U1; an operating part UI through which a user performs operation; and a finisher U3, serving as an example of a post-processing device that performs post-processing on the media discharged from the printer body U1.

Configuration Example of Image Forming Apparatus

In FIG. 2, the printer body U1 includes a controller C, serving as an example of a control part that controls the printer U; a communication unit (not shown) that receives image information transmitted from a print image server COM, serving as an example of an information transmitting device connected to the outside of the printer U via a dedicated cable (not shown); and a marking unit U1*a*, serving as an example of a recording part that records an image on a medium. A personal computer PC, serving as an example of an image transmitting device that transmits information of an image to be printed by the printer U, is connected to the print image server COM via a cable or a line, such as a local area network (LAN).

The marking unit U1*a* includes photoconductors Py, Pm, Pc, and Pk, which correspond to yellow (Y), magenta (M), cyan (C), and black (K) colors, and a photoconductor Po for adding gloss to an image when a photographic image or the like is to be printed. The photoconductors are an example of an image holding part. The surfaces of the photoconductors Py to Po are formed of a photosensitive dielectric.

In FIG. 2, the black photoconductor Pk is surrounded by a charger CCk, serving as an example of a charging part, an exposure device LPHk, serving as an example of a latent-image forming part, a developing device Gk, serving as an example of a developing part, a first transfer roller T1*k*, serving as an example of a first transfer part, and a photoconductor cleaner CLk, serving as an example of a cleaning part for an image holding part, in this order in the rotation direction of the photoconductor Pk.

The other photoconductors Py, Pm, Pc, and Po are also surrounded by chargers CCy, CCm, CCc, and CCo, exposure devices LPHy, LPHm, LPHc, and LPHo, developing devices Gy, Gm, Gc, and Go, first transfer rollers T1*y*, T1*m*, T1*c*, and T1*o*, and photoconductor cleaners CLy, CLm, CLc, and CLo.

Toner cartridges Ky, Km, Kc, Kk, and Ko, serving as an example of a developer accommodating part, are removably supported in the upper part of the marking unit U1*a*. The toner cartridges Ky to Ko accommodate developer to be supplied to the developing devices Gy to Go.

An intermediate transfer belt B, serving an example of an intermediate transfer part and an image holding part, is disposed below the photoconductors Py to Po. The intermediate transfer belt B is nipped between the photoconductors Py to Po and the first transfer rollers T1*y* to T1*o*. The back surface of the intermediate transfer belt B is supported by: a drive roller Rd, serving as an example of a driving part; tension rollers Rt, serving as an example of a tension-applying part; a walking roller Rw, serving as an example of a meandering prevention part; multiple idler rollers Rf, serving as an example of a driven part; a backup roller T2*a*, serving as an example of an opposing part for second transfer; multiple retract rollers R1, serving as an example of a movable member; and the first transfer rollers T1*y* to T1*o*.

A belt cleaner CLB, serving as an example of an intermediate-transfer-part cleaning member, is disposed on the surface of the intermediate transfer belt B, near the drive roller Rd.

A second transfer roller T2*b*, serving as an example of a second transfer member, is disposed so as to oppose the backup roller T2*a* with the intermediate transfer belt B therebetween. A contact roller T2*c*, serving as an example of a contact part, is in contact with the backup roller T2*a* to apply, to the backup roller T2*a*, a voltage having a polarity opposite to the charging polarity of the developer.

The backup roller T2*a*, the second transfer roller T2*b*, and the contact roller T2*c* constitute a second transfer device T2, serving as an example of a second transfer part according to the first exemplary embodiment, and the first transfer rollers T1*y* to T1*o*, the intermediate transfer belt B, the second transfer device T2, and the like constitute transfer devices T1, B, and T2, serving as examples of the transfer parts according to the first exemplary embodiment.

A media feed tray TR1, serving as an example of a storage part, is provided below the second transfer device T2. The media feed tray TR1 accommodates sheets S, serving as an example of media. A pickup roller Rp, serving as an example of a pickup part, and a separation roller Rs, serving as an example of a separation part, are disposed diagonally above and to the right of the medium-feeding tray TR1. A transport path SH, along which a sheet S is transported, extends from the separation roller Rs. Multiple transport rollers Ra, serving as an example of transport parts that transport a sheet S downstream, are disposed along the transport path SH.

A deburring device Bt, serving as an example of an unnecessary portion removing part, is disposed downstream of the separation roller Rs. The deburring device Bt removes an unnecessary portion at the edge of the sheet S, or performs so-called deburring, while nipping the sheet S with a preset pressure and transporting the sheet S downstream.

A multi-feed detection device Jk is disposed downstream of the deburring device Bt. The multi-feed detection device Jk measures the thickness of the sheet S passing therethrough to detect a state in which multiple sheets S overlap each other, that is, so-called multi-feeding.

A correction roller Rc, serving as an example of an orientation correction part, is disposed downstream of the multi-feed detection device Jk. The correction roller Rc corrects inclination, or so-called skew, of the sheet S with respect to the transport direction.

A registration roller Rr, serving as an example of an adjustment part that adjusts the transport timing of the sheet S to the second transfer device T2, is disposed downstream of the correction roller Rc. A media guide SG1, serving as an example of a media guide part, is disposed downstream of the registration roller Rr.

The feeder unit U2 is also provided with media feed trays TR2, TR3, and the like having the same configuration as the media feed tray TR1, the pickup roller Rp, the separation roller Rs, and the transport roller Ra, and transport paths SH extending from the media feed trays TR2 and TR3 join the transport path SH in the printer body U1 on the upstream side of the multi-feed detection device Jk.

Multiple transport belts HB, serving as an example of a media transport part, are disposed downstream of the second transfer roller T2*b* in the sheet transport direction.

A fixing device F, serving as an example of a fixing part, is disposed downstream of the transport belts HB in the sheet transport direction.

The finisher U3 located downstream of the fixing device F accommodates an image inspection device IS.

The transport path SH extends toward a discharge tray TRh, serving as an example of a stacking part, on the downstream side of the image inspection device IS. A discharge roller Rh, serving as an example of a discharge part, is disposed at the downstream end of the transport path SH.

A reversing path SH2, serving as an example of a transport path branching from the transport path SH, is formed downstream of the image inspection device IS. A first gate GT1, serving as an example of a transport-direction switching member, is disposed at a branch point between the reversing path SH2 and the transport path SH.

Multiple pairs of switchback rollers Rb, serving as an example of transport parts capable of rotating in forward and reverse directions, are provided along the reversing path SH2. A connection path SH3, serving an example of a transport path, that branches off from the upstream portion of the reversing path SH2 and joins the transport path SH on the downstream side of the branch point between the transport path SH and the reversing path SH2 is formed upstream of the switchback rollers Rb. A second gate GT2, serving as an example of a transport-direction switching member, is disposed at a branch point between the connection path SH3 and the reversing path SH2.

A turn-back path SH4 for reversing the sheet transport direction, or switching back the sheet S, is disposed below the fixing device F, on the downstream side of the reversing path SH2. Switchback rollers Rb, serving as an example of transport parts capable of rotating in forward and reverse directions, are provided along the turn-back path SH4. A third gate GT3, serving as an example of a transport-direction switching member, is disposed at the entrance of the return path SH4.

The transport path SH on the downstream side of the turn-back path SH4 joins the transport path SH extending from the media feed tray TR1.

Operation of Image Forming Apparatus

The printer U starts a job, which is an image forming operation, upon receipt of image information transmitted from the personal computer PC via the print image server COM. Once the job is started, the photoconductors Py to Po, the intermediate transfer belt B, and the like rotate.

The photoconductors Py to Po are rotationally driven by a drive source (not shown).

A preset voltage is applied the chargers CCy to CCo, and the chargers CCy to CCo charge the surfaces of the photoconductors Py to Po.

The exposure devices LPHy to LPHo, serving as an example of a latent image forming device and an example of a light-emitting device, output light Ly, Lm, Lc, Lk, and Lo for writing latent images in response to a control signal from the controller C to write electrostatic latent images on the charged surfaces of the photoconductors Py to Po.

The developing devices Gy to Go develop the electrostatic latent images on the surfaces of the photoconductors Py to Po.

The toner cartridges Ky to Ko replenish the developer consumed by the developing operation performed by the developing devices Gy to Go.

A first transfer voltage having a polarity opposite to the charging polarity of the developer is applied to the first transfer rollers T1*y* to T1*o*, so that the visible images on the surfaces of the photoconductors Py to Po are transferred to the surface of the intermediate transfer belt B.

The photoconductor cleaners CLy to CLo remove and clean the developer remaining on the surfaces of the photoconductors Py to Po after the first transfer.

When the intermediate transfer belt B passes through first transfer areas facing the photoconductors Py to Po, the images are transferred to the intermediate transfer belt B in the order of O, Y, M, C, and K in a superposed manner, and the intermediate transfer belt B passes through a second transfer area Q4 facing the second transfer device T2. In the case of a monochrome image, an image of one color is transferred and sent to the second transfer area Q4.

The pickup roller Rp feeds a sheet S from the media feed trays TR1 to TR3, which feed sheets S, in accordance with the size of the received image information, the designated ion of the sheet S, and the size, type, and the like of the sheets S stored.

The separation roller Rs separates the sheets S fed from the pickup roller Rp into individual sheets S.

The deburring device Bt removes burrs by applying a preset pressure to the paper S passing therethrough.

The multi-feed detection device Jk detects multi-feeding of sheets S by detecting the thickness of the sheet S passing therethrough.

The correction roller Rc corrects skew by bringing the sheet S passing therethrough into contact with a wall surface (not shown).

The registration roller Rr feeds the sheet S in accordance with the timing at which the image on the intermediate transfer belt B is brought to the second transfer area Q4.

The media guide SG1 guides the sheet S fed by the registration roller Rr to the second transfer area Q4.

In the second transfer device T2, a preset second transfer voltage having the same polarity as the charging polarity of the developer is applied to the backup roller T2*a* via the contact roller T2*c*, whereby the image on the intermediate transfer belt B is transferred to the sheet S.

The belt cleaner CLB removes and cleans the developer remaining on the intermediate transfer belt B after the image has been transferred in the second transfer area Q4.

The transport belts HB hold and transport the sheet S having the image transferred by the second transfer device T2 to the downstream side.

The fixing device F includes a heating roller Fh, serving as an example of a heating member, and a pressure roller Fp, serving as an example of a pressure member. A heater h, serving as an example of a heat source, is accommodated in the heating roller Fh. The fixing device F applies heat and pressure to the sheet S passing through a fixing area Q5 where the heating roller Fh and the pressure roller Fp are in contact with each other to fix the unfixed image on the surface of the sheet S. The heating roller Fh and the pressure roller Fp constitute fixing members Fp and Fh according to the first exemplary embodiment.

The image inspection device IS reads the image on the sheet S that has passed through the fixing device F to inspect for any defect in the image.

When duplex printing is performed, the sheet S that has passed through the image inspection device IS is transported to the reversing path SH2 by the action of the first gate GT1, switched back at the turn-back path SH4, and transported through the transport path SH again to the registration roller Rr, where printing is performed on the second surface.

When the sheet S is discharged with the surface having the image facing up, that is, when so-called face-up discharge is performed, the sheet S is transported to the transport path SH and discharged onto the discharge tray TRh by the discharge roller Rh.

Meanwhile, when the sheet is discharged with the surface having the image facing down, that is, when so-called face-down discharge is performed, the sheet S is temporarily transported from the transport path SH to the reversing path SH2. Then, after the trailing end of the sheet S in the transport direction has passed through the second gate GT2, the forward rotation of the switchback rollers Rb stops. Then, the second gate GT2 is switched, the switchback rollers Rb rotates reversely, and the sheet S is transported to the connection path SH3 and is transported to the discharge tray TRh.

The discharged sheets S are stacked on the discharge tray TRh.

Configuration Example of Image Inspection Device

Figure 3:
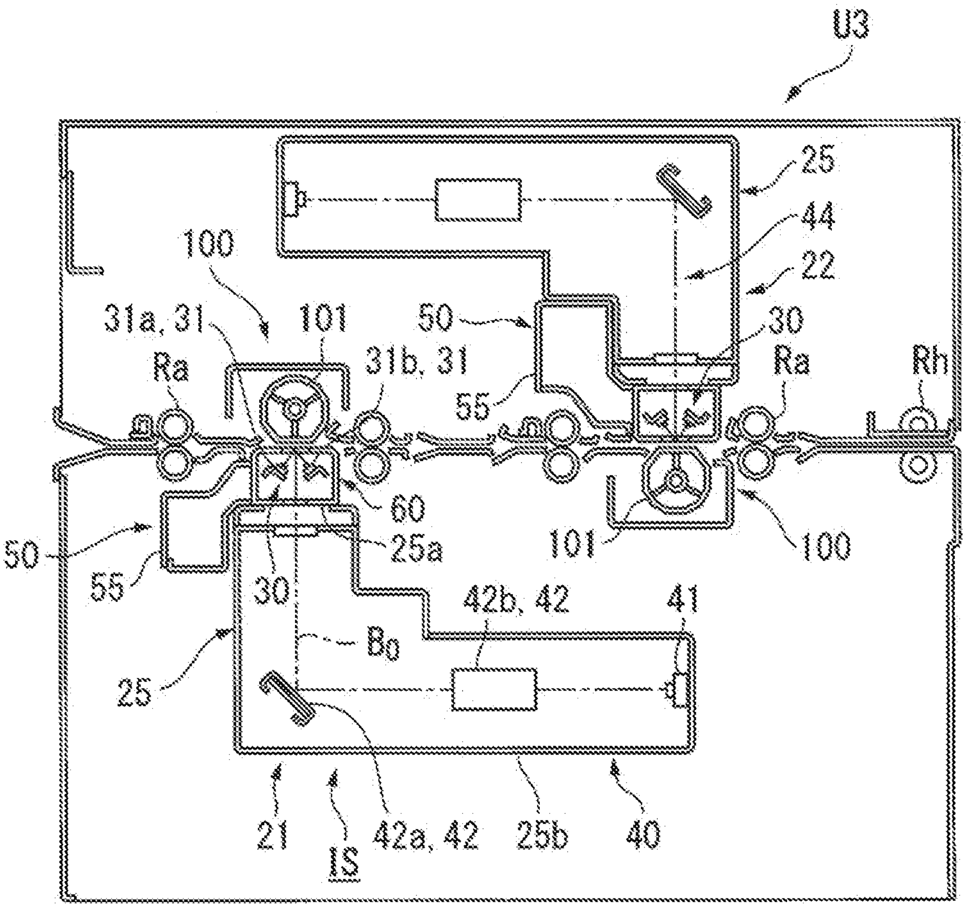
FIG. 3 shows a configuration example of the image inspection device and the vicinity thereof in the image forming apparatus shown in FIG. 2.

FIG. 3 shows a configuration example of the image inspection device IS shown in FIG. 2.

In FIG. 3, the image inspection device IS includes a first inspection unit 21 and a second inspection unit 22, which are provided on the upstream side and downstream side, respectively, in the sheet transport direction, in the transport path SH extending in a substantially horizontal direction in the finisher U3.

The first inspection unit 21 inspects the image G on the lower surface of the sheet S, and the second inspection unit 22 inspects the image G on the upper surface of the sheet S.

First Inspection Unit

Figure 4:
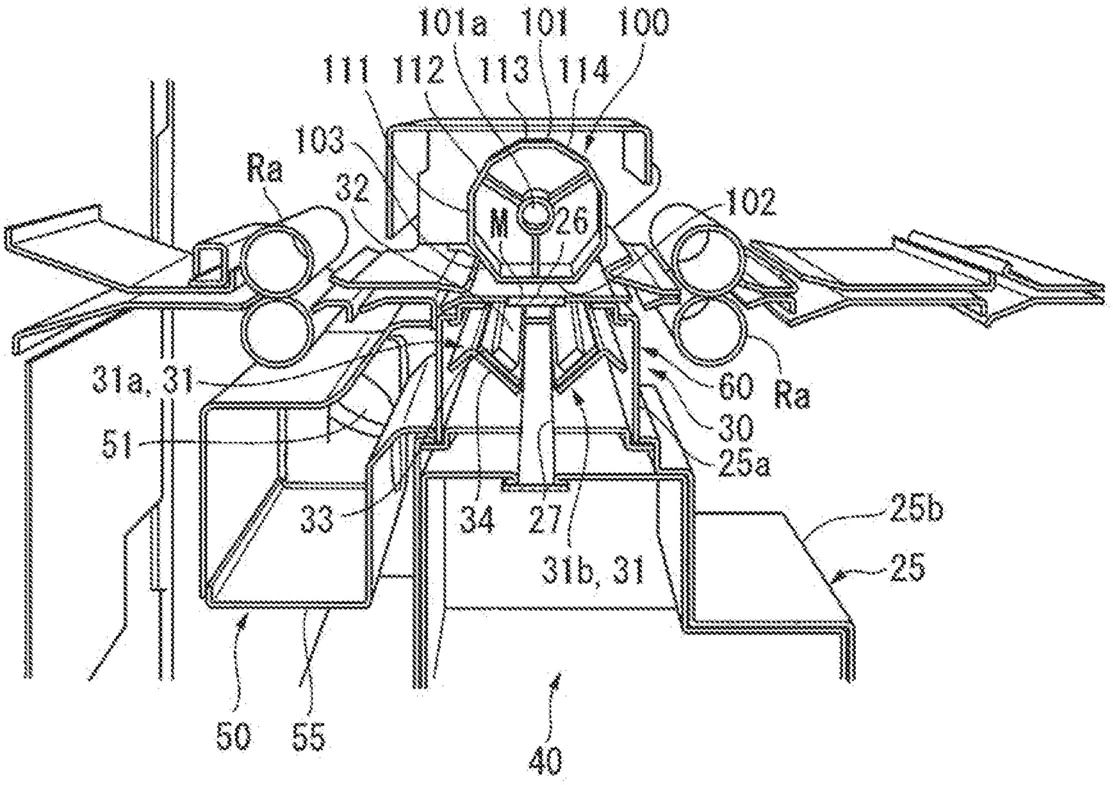
FIG. 4 is a partially cutaway view showing the relevant part of the image inspection device according to the first exemplary embodiment.

In this example, as shown in FIG. 4, the first inspection unit 21 includes an illumination unit 30, serving as an illumination part that radiates light on the image G on the lower surface of the sheet S passing through the transport path SH, and a reading unit 40, serving as a reading part that reads reflection light from the image G. A calibration unit 100, serving as a calibration part that calibrates the illumination unit 30 and the reading unit 40, is disposed opposite the first inspection unit 21 with the transport path SH therebetween.

In this example, the first inspection unit 21 includes a unit case 25 for accommodating the illumination unit 30 and the reading unit 40. The unit case 25 is divided into an illumination case section 25*a* for accommodating the illumination unit 30 and a reading case section 25*b* for accommodating the reading unit 40.

Illumination Unit

In this example, the illumination case section 25*a* is formed as an accommodating box having a rectangular cross-section extending in the width direction, which intersects the sheet transport direction. The illumination case section 25*a* has a top plate facing the transport path SH, the top plate having a slit-like opening in which a window 26 made of transparent plastic or glass is provided, and a bottom plate, which is away from the window 26 and has a slit-like communication opening 27 that communicates with the reading case section 25*b*.

The illumination unit 30 includes two illumination lamps 31 having LED substrates 33 disposed in the longitudinal direction, which is parallel to the width direction of the sheet S, and, for example, one or more rows of white LEDs, serving as light sources 32, are mounted on each LED substrate 33. The two illumination lamps 31 (31*a* and 31*b*) are attached to the inside of the illumination case section 25*a* via support brackets 34.

The illumination lamps 31 (31*a* and 31*b*) are arranged symmetrically with respect to an inspection point M, which is a point on the surface along the longitudinal direction of the window 26, such that the radiation angle with respect to the sheet S is, for example, 45 to 50 degrees.

Reading Unit

In this example, the reading case section 25*b* is formed as an accommodating box bent in a substantially L shape and has a top plate communicating with the communication opening 27 in the illumination case section 25*a*.

In this example, the light reflected from the image G on the sheet S has an optical axis $B_0$ directed to the reading case section 25*b* through the window 26 and the communication opening 27 in the illumination case section 25*a*. The reading unit 40 in this example includes a CCD sensor 41, serving as a reading sensor provided at a predetermined position in the reading case section 25*b*, and an imaging optical system 42 that is provided at a predetermined position in the reading case section 25*b* and that forms an image of the light reflected from the image G on the surface of the CCD sensor 41. The imaging optical system 42 includes, for example, one or more reflection mirrors 42*a* (one in this example) and an imaging lens 42*b* that forms an image on the surface of the CCD sensor 41, serving as a focal position.

Cooling Mechanism

In this example, when the illumination lamps 31 (31*a*, 31*b*) continue the light irradiation operation, for example, the LED substrates 33 generate heat. Hence, in order to keep good imaging performance of the CCD sensor 41, it is necessary to uniformly cool the entire areas of the illumination lamps 31 in the longitudinal direction, which is parallel to the width direction of the sheet S, to make the intensity of radiated light in the longitudinal direction of the illumination lamps 31 uniform.

In this example, the first inspection unit 21 has a cooling mechanism 50 as described below to uniformly cool the entire areas of the illumination lamps 31 in the longitudinal direction.

Configuration Example of Cooling Mechanism

Figure 5A:
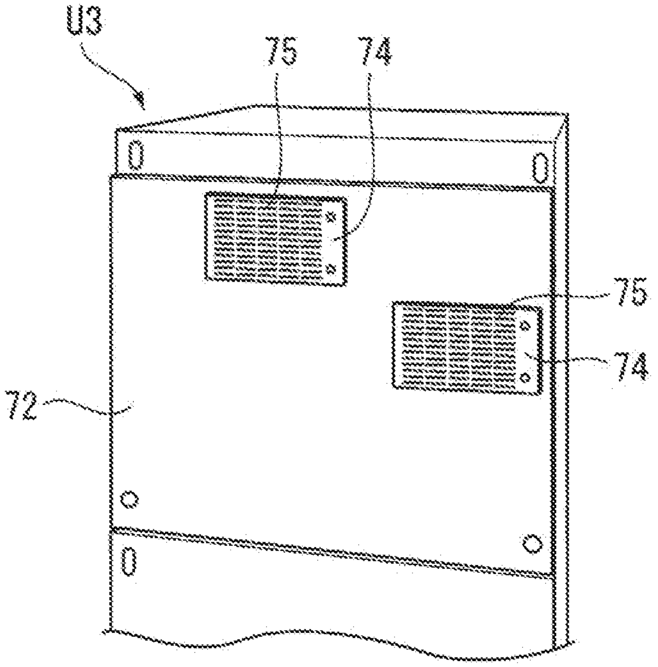
FIG. 5A shows a finisher provided with the image inspection device as viewed from the back.
Figure 5B:
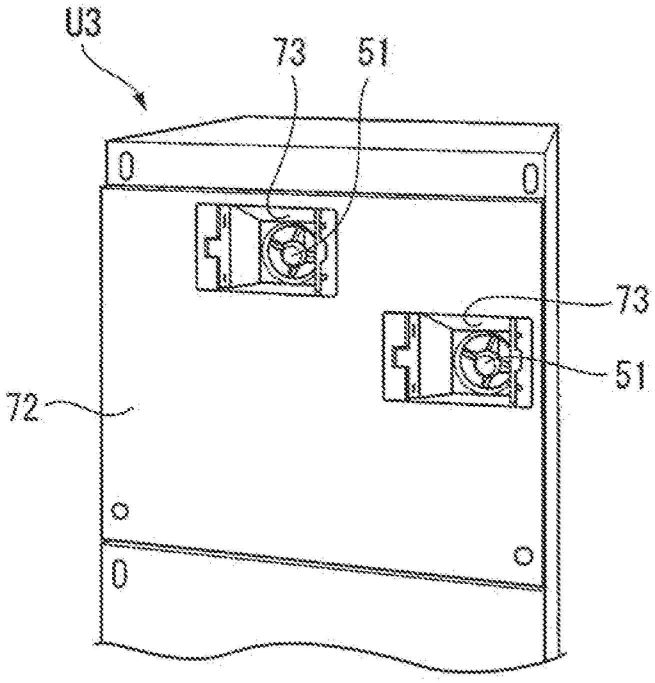
FIG. 5B shows the finisher as viewed from the back, but without filtered lids on outside-air introduction portions.
Figure 6:
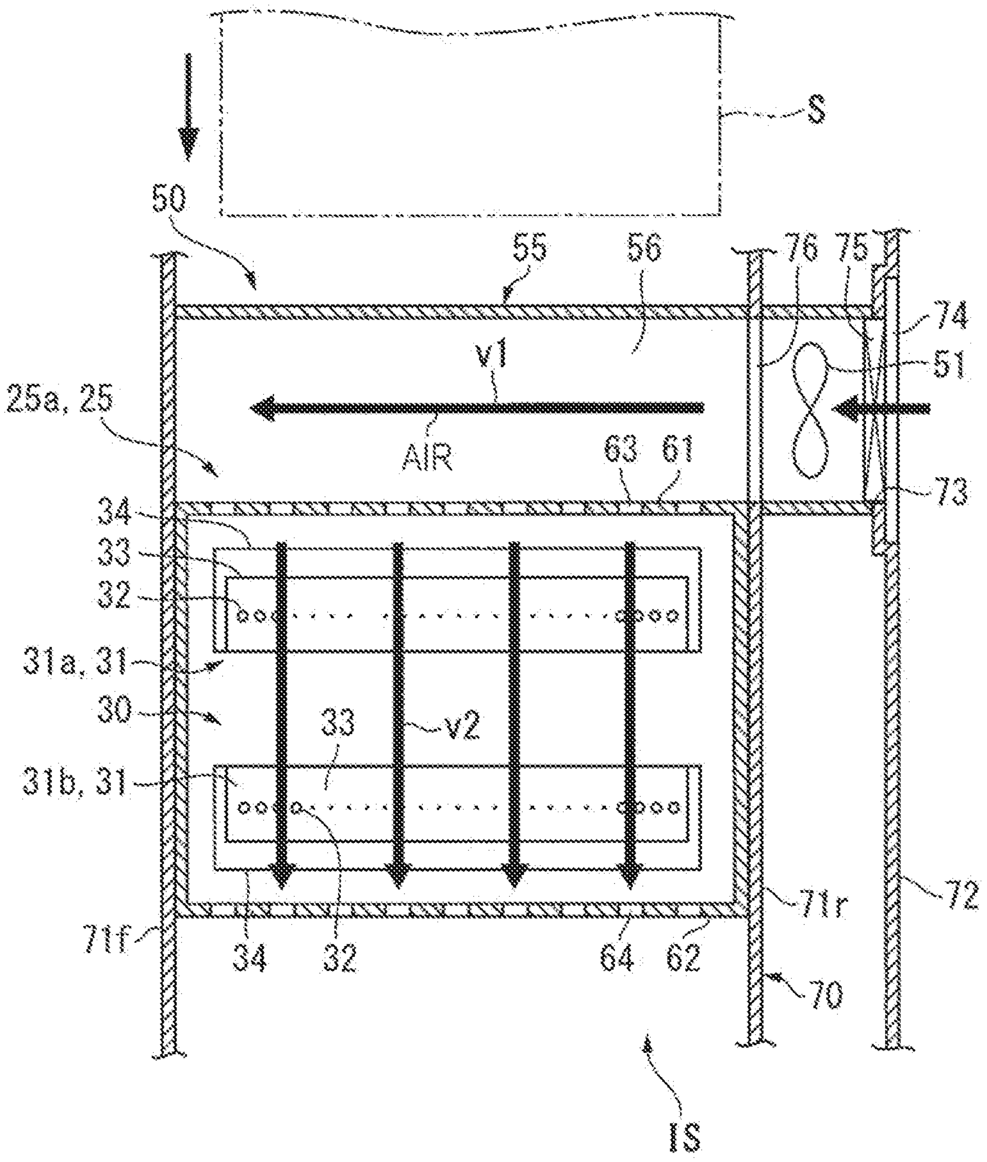
FIG. 6 schematically shows a configuration of a cooling mechanism for a first inspection unit of the image inspection device according to the first exemplary embodiment.

In this example, as shown in FIGS. 5 and 6, the cooling mechanism 50 includes: a fan 51, serving as one blowing part that sucks and sends the outside air; a first guide duct 55 extending in the width direction of the sheet S to guide the air blown from the fan 51 to a flow path 56 extending in the width direction of the sheet S; and a second guide duct 60 that guides the air guided by the first guide duct 55 to the illumination case section 25*a*, in the same direction as the sheet transport direction.

In this example, as shown in FIGS. 5 and 6, the fan 51 is disposed between a rear frame 71*r* located on the rear side of the housing 70 of the finisher U3 and a rear cover 72 covering the rear side of the rear frame 71*r*. The rear cover 72 has an outside-air introduction port 73 at a position corresponding to the fan 51, and a lid 74 with a cleaning filter 75, serving as a filter part, is removably attached to the outside-air introduction port 73.

The first guide duct 55 extends from a blowing opening 76 provided in the rear frame 71*r*, at a position corresponding to the fan 51, to a front frame 71*f* located on the front side of the housing 70 along the illumination case section 25*a* of the unit case 25, forming the flow path 56 extending in the width direction of the sheet S.

Figure 7A:
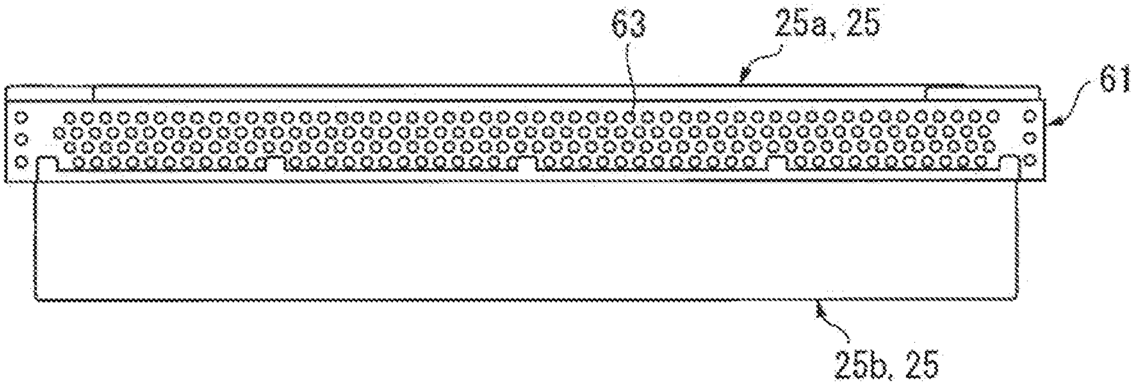
FIGS. 7A and 7B show example ventilation structures of an inlet-side partition plate and an outlet-side partition plate, respectively, of an illumination case part according to the first exemplary embodiment.
Figure 7B:
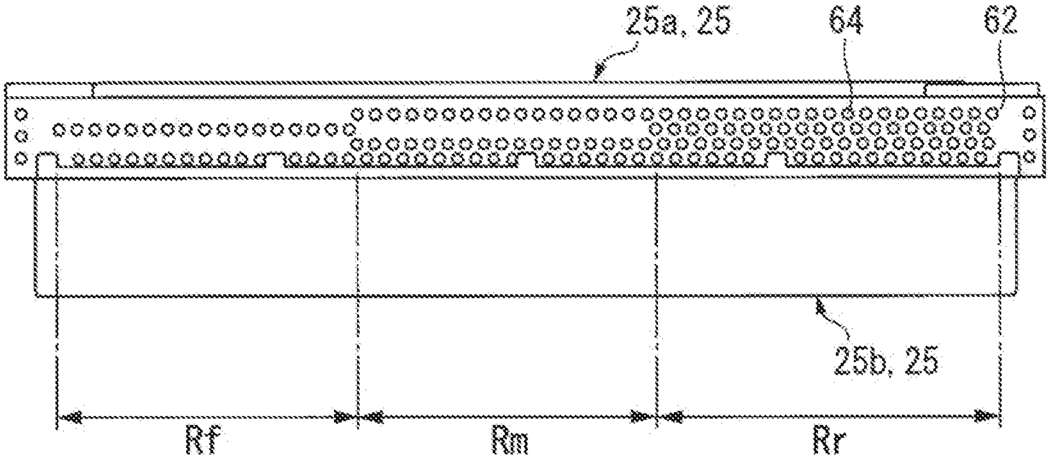
Figure 7C:
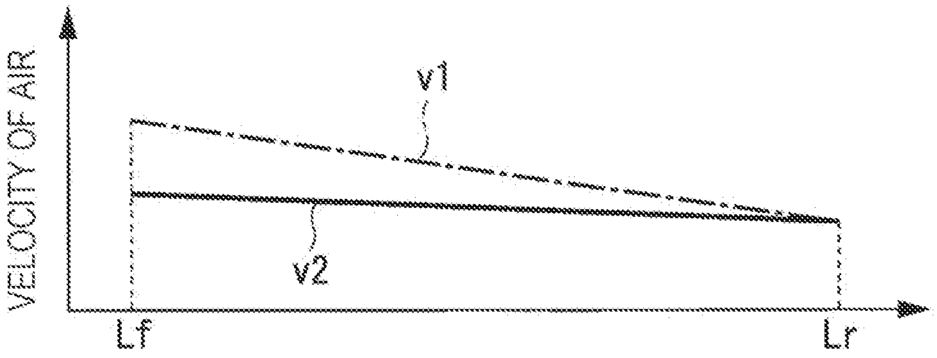
FIG. 7C shows cooling-air velocity distributions in first and second guide ducts according to the first exemplary embodiment.

In particular, in this example, as shown in FIG. 7C, the flow path 56 of the first guide duct 55 has a cross-sectional structure in which the air velocity v1 is higher on the side farther from the fan 51 than on the side closer to the fan 51.

By making the second guide duct 60 have a structure in which the ventilation area is gradually reduced from the side closer to the fan 51 toward the side farther from the fan 51 in the flow path direction of the first guide duct 55, it is possible to make the velocity v2 of the air in the illumination case section 25*a* and the air volume uniform.

Specifically, as shown in FIGS. 7A and 7B, an inlet-side partition plate 61, serving as an inlet-side partition member, and an outlet-side partition plate 62, serving as an outlet-side partition member, for partitioning the space inside the illumination case section 25*a* have multiple vent holes 63 and 64, respectively. The ventilation area of the vent holes 63 in the inlet-side partition plate 61 is uniform in the flow direction of the first guide duct 55, and the ventilation area of the vent holes 64 in the outlet-side partition plate 62 is gradually reduced from the side closer to the fan 51 toward the side farther from the fan 51 in the flow direction of the first guide duct 55.

In this example, the inlet-side partition plate 61 has rows of four vent holes 63 per row arranged in a staggered manner so as to be uniformly distributed in the flow path direction of the first guide duct 55. The outlet-side partition plate 62 has rows of four vent holes 64 per row arranged in a staggered manner so as to be uniformly distributed in a rear-side area Rr, which is close to the fan 51, rows of three vent holes 64 per row arranged so as to be uniformly distributed in an intermediate area Rm, which is farther from the fan 51 than the rear-side area Rr, and rows of two vent holes 64 per row arranged so as to be uniformly distributed in a front-side area Rf, which is farthest from the fan 51.

The ventilation area in the outlet-side partition plate 62 with the vent holes 64 can be adjusted by changing the ratio of the areas Rr to Rf.

Operation of Cooling Mechanism

In this example, the cooling mechanism 50 operates as follows.

First, as shown in FIG. 6, when the outside air is sucked by the fan 51, the air blown from the fan 51 is guided along the first guide duct 55 in the width direction of the sheet S.

At this time, because the second guide duct 60 guides the air guided by the first guide duct 55 from the vent holes 63 in the inlet-side partition plate 61 toward the vent holes 64 in the outlet-side partition plate 62, the cooling air flows in the sheet transport direction in the illumination case section 25*a*. Hence, foreign matter, such as paper dust, floating in the illumination case section 25*a* is discharged outside the illumination case section 25*a* through the vent holes 64 in the outlet-side partition plate 62.

Hence, the risk of attachment of foreign matter floating in the illumination case section 25*a* to the surfaces of the illumination lamps 31 is eliminated. Furthermore, foreign matter floating in the illumination case section 25*a* hardly enters the reading case section 25*b*, and hence, there is no risk of attachment of foreign matter to the surface of the CCD sensor 41.

In this example, as shown in FIG. 7C, the velocity v1 of the air blown from the fan 51 is higher on the side farther from the fan 51 than on the side closer to the fan 51 in the first guide duct 55. However, by modifying the ventilation structure of the second guide duct 60, as shown in FIG. 7C, the velocity v2 of the cooling air passing through the illumination case section 25*a* becomes nearly uniform in the longitudinal direction of the illumination lamps 31 (31*a*, 31*b*), thus making the flow rate of the cooling air passing through the illumination lamps 31 (31*a*, 31*b*) nearly uniform. Thus, it is possible to uniformly cool the entire areas of the illumination lamps 31 in the longitudinal direction thereof.

Calibration Unit

In this example, the calibration unit 100 for calibrating the first inspection unit 21 is provided.

The calibration unit 100 includes a rotary drum 101, serving as an example of a rotating part. The rotary drum 101 is formed in the shape of a polygonal cylinder having a predetermined number of sides and includes a detection reference surface 102 directed toward the transport path SH when an image G on a sheet S is detected, and a retreat surface 103 directed toward the transport path SH when detection of an image G is not performed.

The rotary drum 101 also includes reference surfaces (e.g., a white reference surface 111, a yellow reference surface 112, a cyan reference surface 113, and a magenta reference surface 114) corresponding to the respective colors to be used in color gamut correction and the like.

The rotary drum 101 of this type switches the surfaces directed to the transport path SH by rotating about a rotation axis 101*a*. A control circuit (not shown) switches the surfaces of the rotary drum 101.

Second Inspection Unit

Unlike the first inspection unit 21, the second inspection unit 22 is disposed above the transport path SH and includes an illumination unit 30 that radiates light on an image G on the upper surface of a sheet S passing through the transport path SH, a reading unit 40 that reads reflection light from the image G, and a cooling mechanism 50 that cools the illumination unit 30. A calibration unit 100, serving as a calibration part, is disposed opposite the second inspection unit 22 with the transport path SH therebetween.

In this example, the first and second inspection units 21 and 22 are merely upside down with respect to each other about the transport path SH, and the illumination units 30, the reading units 40, and the cooling mechanisms 50 constituting the inspection units have substantially the same structures. The cooling mechanism 50 of the second inspection unit 22 is disposed so as to send the cooling air to the illumination unit 30 in the unit case 25 in the same direction as the sheet transport direction. The calibration unit 100 also has the same structure as that for the first inspection unit 21, except that the calibration unit 100 is disposed upside down.

Modification

Although the image inspection device IS according to the above-described exemplary embodiment includes the first and second inspection units 21 and 22 for inspecting images G on both surfaces of a medium S, the configuration is not limited thereto, and a single inspection unit may be used.

Although the calibration units 100 are used in this example, the calibration units 100 may be omitted.

First Comparative Example

Figure 8A:
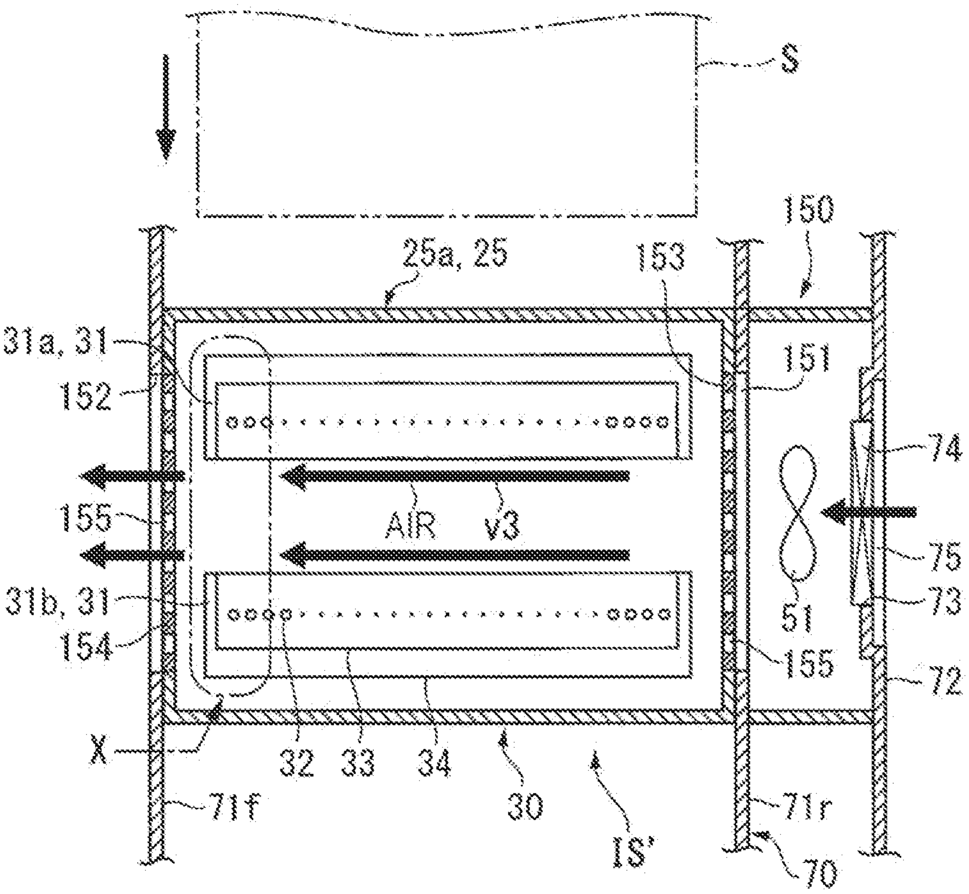
FIG. 8A schematically shows a configuration of a cooling mechanism for a first inspection unit of an image inspection device according to a first comparative embodiment.

FIG. 8A shows an image inspection device according to a first comparative embodiment.

In FIG. 8A, an image inspection device IS' includes the illumination unit 30 and the reading unit (not shown), similarly to the first exemplary embodiment. The configuration of a cooling mechanism 150 is different from that according to the first exemplary embodiment. The same components as those in the first exemplary embodiment will be denoted by the same reference signs, and detailed descriptions thereof will be omitted.

Similarly to the first exemplary embodiment, the cooling mechanism 150 has the fan 51, serving as one blowing part for sucking and blowing outside air, disposed between the rear frame 71*r* on the rear side of the housing 70 of the finisher U3 and the rear cover 72 covering the rear side of the rear frame 71*r*. Unlike the first exemplary embodiment, the illumination case 25*a* has blowing openings 151 and 152 on the rear frame 71*r* side and the front frame 71*f* side, respectively, and partition plates 153 and 154 with vent holes 155 are attached to the blowing openings 151 and 152, respectively.

Figure 8B:
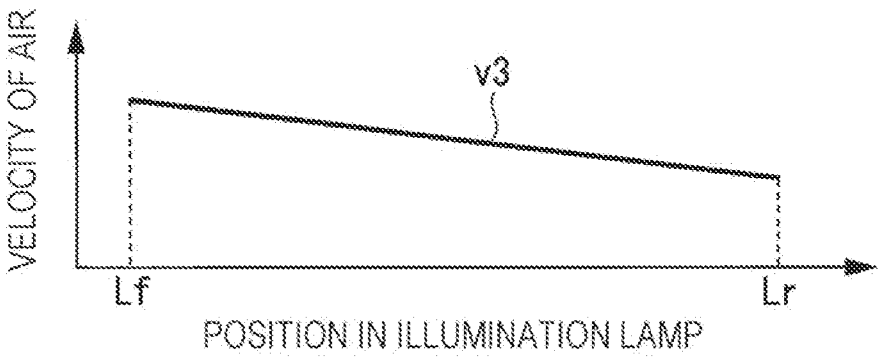
FIG. 8B shows a cooling-air velocity distribution in an illumination case part according to the first comparative embodiment.

In this example, the illumination case section 25*a* serves as a guide duct for the air blown from the fan 51, and the air blown from the fan 51 flows in the longitudinal direction of the illumination lamps 31 in the illumination case section 25*a*. As shown in FIG. 8B, because the velocity v3 of the air in the illumination case section 25*a* is higher at a front end Lf than at a rear end Lr of the illumination lamps 31 in the longitudinal direction, it is difficult to make the flow rate of the cooling air uniform over the entire areas of the illumination lamps 31 in the longitudinal direction.

Furthermore, when foreign matter is floating in the illumination case section 25*a*, the floating foreign matter is likely to be attached to front end areas X of the illumination lamps 31 in the longitudinal direction.

Second Exemplary Embodiment

Figure 9:
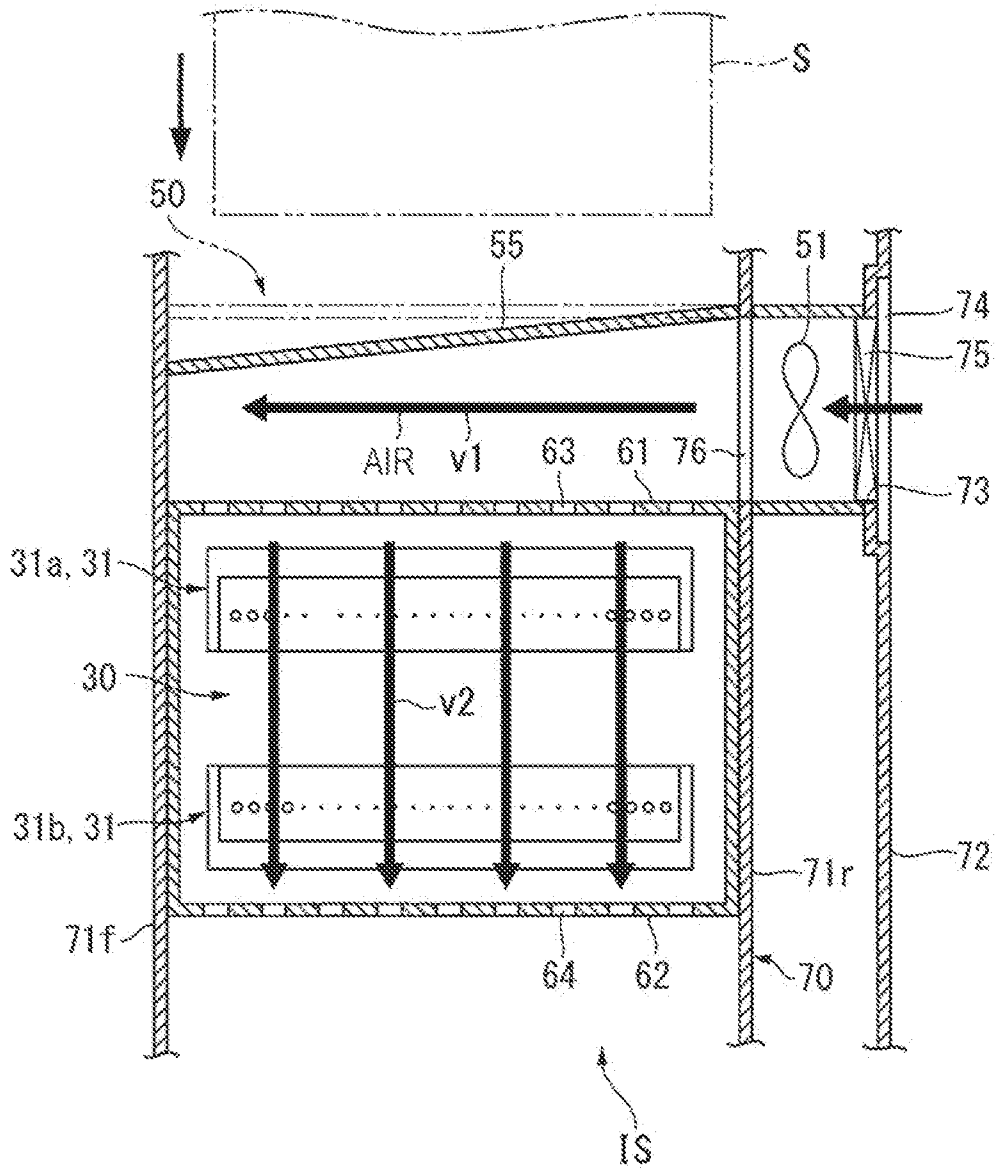
FIG. 9 schematically shows a configuration of a cooling mechanism for a first inspection unit of an image inspection device according to a second exemplary embodiment.

FIG. 9 shows the relevant part of the image inspection device according to a second exemplary embodiment.

The image inspection device IS includes the first and second inspection units 21 and 22 as in the first exemplary embodiment. The first and second inspection units 21 and 22 each include the illumination unit 30 and the reading unit 40 as those in the first exemplary embodiment, and a cooling mechanism 50 different from that in the first exemplary embodiment. The same components as those in the first exemplary embodiment will be denoted by the same reference signs, and detailed descriptions thereof will be omitted.

In this example, the cooling mechanism 50 includes a first guide duct 55 and a second guide duct 60 that are different from those in the first exemplary embodiment.

Specifically, the first guide duct 55 has a cross-sectional structure that makes the velocity v1 of the air blown from the fan 51 uniform. In other words, by reducing the ventilation area of the first guide duct 55 from the side closer to the fan 51 toward the side farther from the fan 51, the velocity v1 of the air passing through the first guide duct 55 is adjusted to be more uniform.

Figure 10A:
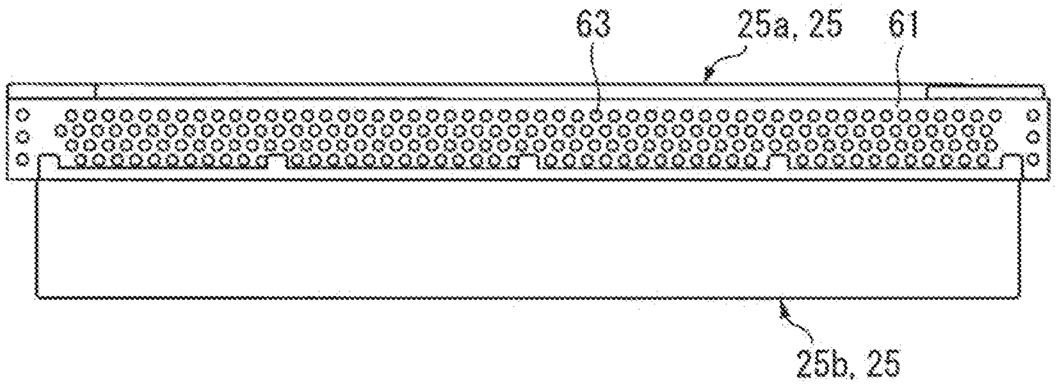
FIGS. 10A and 10B show example ventilation structures of an inlet-side partition plate and an outlet-side partition plate, respectively, of an illumination case part according to the second exemplary embodiment.
Figure 10B:
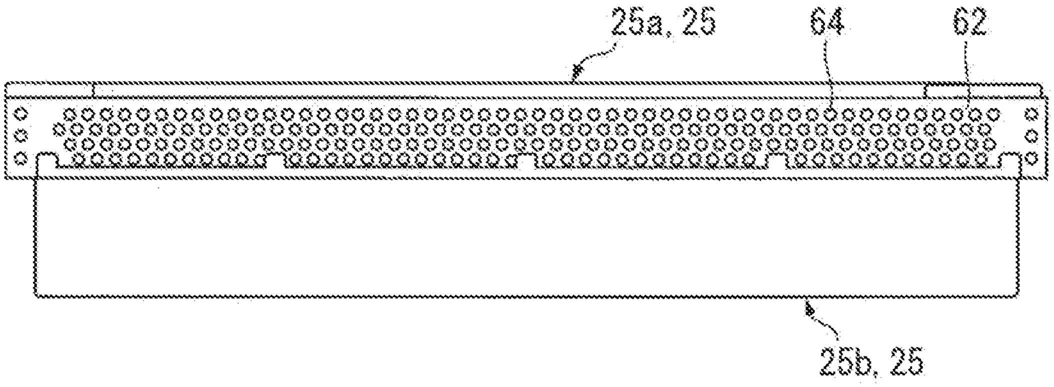
Figure 10C:
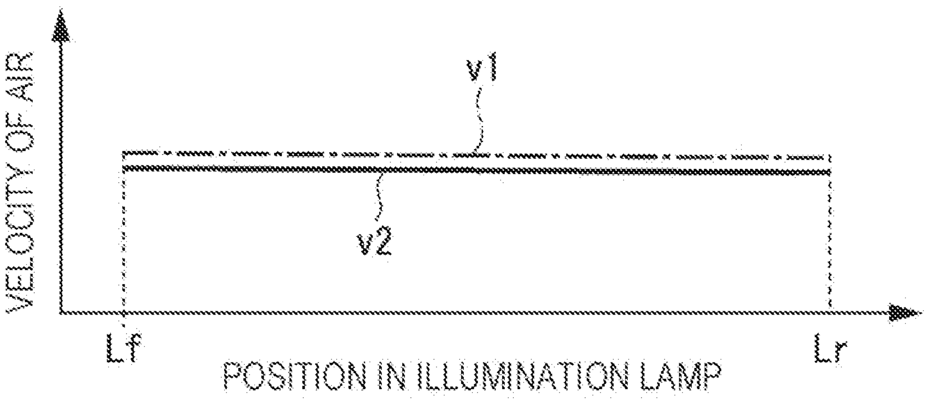
FIG. 10C shows cooling-air velocity distributions in first and second guide ducts according to the second exemplary embodiment.

The second guide duct 60 has a uniform ventilation area in the flow path direction of the first guide duct 55. Specifically, as shown in FIGS. 10A and 10B, the inlet-side partition plate 61 and the outlet-side partition plate 62 of the illumination case section 25*a* respectively have, for example, rows of four vent holes 63 per row and rows of four vent holes 64 per row arranged in a staggered manner so as to be uniformly distributed in the longitudinal direction.

Because the velocity v1 of the cooling air in the first guide duct 55 is adjusted to be uniform in the flow path direction, the cooling air guided from the first guide duct 55 to the second guide duct 60 flows in the sheet transport direction and uniformly cools the entire areas of the illumination lamps 31 (31*a*, 31*b*) in the longitudinal direction with a uniform velocity v2 and a uniform air volume.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An image inspection device comprising: an illumination part extending in a width direction of a medium, which intersects a medium transport direction, so as to face a medium transport path, and configured to radiate light on an image formed on a surface of the medium; a reading part configured to read reflected light from the image as image inspection information; and a cooling part configured to cool an entire area of the illumination part in the width direction of the medium, wherein the cooling part includes one blowing part provided on one side in the width direction of the medium and configured to suck and blow outside air, a first guide extending in the width direction of the medium and configured to guide the air blown from the blowing part to a flow path extending in the width direction of the medium, and a second guide configured to guide the air, guided by the first guide, in the medium transport direction to a space where the illumination part is disposed, and distribute the air such that an air volume is uniform over the entire area of the illumination part in the width direction of the medium.

(((2)))

The image inspection device according to (((1))), wherein the blowing part is provided on a rear side, which is opposite to a front side, of the image inspection device.

(((3)))

The image inspection device according to (((1))) or (((2))), wherein the illumination part and the reading part are disposed below the medium transport path.

(((4)))

The image inspection device according to any one of (((1))) to (((3))), wherein the second guide is configured to guide the air in the medium transport direction.

(((5)))

The image inspection device according to any one of (((1))) to (((4))), wherein the first guide has a structure in which a velocity of air is higher on a side farther from the blowing part than a side closer to the blowing part.

(((6)))

The image inspection device according to (((5))), wherein the second guide has a structure in which a ventilation area is gradually reduced from the side closer to the blowing part toward the side farther from the blowing part in a flow path direction of the first guide.

(((7)))

The image inspection device according to (((6))), wherein the second guide has an inlet-side partition member and an outlet-side partition member that partition a space where the illumination part is disposed and that have a plurality of vent holes, the vent holes in the inlet-side partition member have a uniform ventilation area in the flow path direction of the first guide, and the vent holes in the outlet-side partition member have a ventilation area that is gradually reduced from the side closer to the blowing part toward the side farther from the blowing part in the flow path direction of the first guide.

(((8)))

The image inspection device according to any one of (((1))) to (((4))), wherein the first guide has a cross-sectional structure that makes the velocity of the air blown from the blowing part uniform, and the second guide has a uniform ventilation area in a flow path direction of the first guide.

(((9)))

An image forming apparatus comprising: the image inspection device according to any one of (((1))) to (((8))); and an image forming device that is provided upstream of the image inspection device in the medium transport direction and that forms an image on the surface of the medium.

What is claimed is:

1. An image inspection device comprising:

an illumination part extending in a width direction of a medium, which intersects a medium transport direction, so as to face a medium transport path, and configured to radiate light on an image formed on a surface of the medium;

a reading part configured to read reflected light from the image as image inspection information; and a cooling part configured to cool an entire area of the illumination part in the width direction of the medium, wherein the cooling part includes:

one blowing part provided on one side in the width direction of the medium and configured to suck and blow outside air;

a first guide extending in the width direction of the medium and configured to guide the air blown from the blowing part to a flow path extending in the width direction of the medium; and a second guide configured to guide the air, guided by the first guide, in the medium transport direction to a space where the illumination part is disposed, and distribute the air such that an air volume is uniform over the entire area of the illumination part in the width direction of the medium.

2. The image inspection device according to claim 1, wherein the blowing part is provided on a rear side, which is opposite to a front side, of the image inspection device.

3. An image forming apparatus comprising:

the image inspection device according to claim 2; and an image forming device that is provided upstream of the image inspection device in the medium transport direction and that forms an image on the surface of the medium.

4. The image inspection device according to claim 1, wherein the illumination part and the reading part are disposed below the medium transport path.

5. An image forming apparatus comprising:

the image inspection device according to claim 4; and an image forming device that is provided upstream of the image inspection device in the medium transport direction and that forms an image on the surface of the medium.

6. The image inspection device according to claim 1, wherein the second guide is configured to guide the air in the medium transport direction.

7. An image forming apparatus comprising:

the image inspection device according to claim 6; and an image forming device that is provided upstream of the image inspection device in the medium transport direction and that forms an image on the surface of the medium.

8. The image inspection device according to claim 1, wherein the first guide has a structure in which a velocity of air is higher on a side farther from the blowing part than a side closer to the blowing part.

9. The image inspection device according to claim 8, wherein the second guide has a structure in which a ventilation area is gradually reduced from the side closer to the blowing part toward the side farther from the blowing part in a flow path direction of the first guide.

10. The image inspection device according to claim 9, wherein the second guide has an inlet-side partition member and an outlet-side partition member that partition a space where the illumination part is disposed and that have a plurality of vent holes, the vent holes in the inlet-side partition member have a uniform ventilation area in the flow path direction of the first guide, and the vent holes in the outlet-side partition member have a ventilation area that is gradually reduced from the side closer to the blowing part toward the side farther from the blowing part in the flow path direction of the first guide.

11. An image forming apparatus comprising:

the image inspection device according to claim 10; and an image forming device that is provided upstream of the image inspection device in the medium transport direction and that forms an image on the surface of the medium.

12. An image forming apparatus comprising:

the image inspection device according to claim 9; and an image forming device that is provided upstream of the image inspection device in the medium transport direction and that forms an image on the surface of the medium.

13. An image forming apparatus comprising:

the image inspection device according to claim 8; and an image forming device that is provided upstream of the image inspection device in the medium transport direction and that forms an image on the surface of the medium.

14. The image inspection device according to claim 1, wherein the first guide has a cross-sectional structure that makes the velocity of the air blown from the blowing part uniform, and the second guide has a uniform ventilation area in a flow path direction of the first guide.

15. An image forming apparatus comprising:

the image inspection device according to claim 14; and an image forming device that is provided upstream of the image inspection device in the medium transport direction and that forms an image on the surface of the medium.

16. An image forming apparatus comprising:

the image inspection device according to claim 1; and an image forming device that is provided upstream of the image inspection device in the medium transport direction and that forms an image on the surface of the medium.

17. An image inspection device comprising:

illumination means, extending in a width direction of a medium, which intersects a medium transport direction, so as to face a medium transport path, for radiating light on an image formed on a surface of the medium;

reading means for reading reflected light from the image as image inspection information; and cooling means for cooling an entire area of the illumination means in the width direction of the medium, wherein the cooling means includes:

one blowing means, provided on one side in the width direction of the medium, for sucking and blowing outside air, first guide means, extending in the width direction of the medium, for guiding the air blown from the blowing means to a flow path extending in the width direction of the medium, and second guide means for guiding the air, guided by the first guide means, in the medium transport direction to a space where the illumination means is disposed, and distributing the air such that an air volume is uniform over the entire area of the illumination means in the width direction of the medium.

* * * * *